United States Patent
Borman et al.

(10) Patent No.: US 6,606,654 B1
(45) Date of Patent: Aug. 12, 2003

(54) LINK DELIVERY FOR SUBSEQUENT RETRIEVAL OF NETWORKED INFORMATION

(75) Inventors: Gilbert Borman, Bloomfield Hills, MI (US); Christopher Piedmonte, Fallbrook, CA (US); John Martin, Wasilla, AK (US); Matapadi Ramachandra Acharya, Karnataka State (IN); Murali Kishan Bhat, Karnataka State (IN); Sudheesh Chandran Kakkroth Chakkapoyyan, Kerala (IN); Vinaya Kumari, Karnataka State (IN)

(73) Assignee: NetJumper, Inc., Southfield, MI (US)

( * ) Notice: Subject to any disclaimer, the term of this patent is extended or adjusted under 35 U.S.C. 154(b) by 0 days.

(21) Appl. No.: 09/503,533

(22) Filed: Feb. 14, 2000

(51) Int. Cl.[7] ............................................. G06F 15/16
(52) U.S. Cl. ....................... 709/219; 709/218; 709/245; 707/101
(58) Field of Search ............................... 345/826; 707/3, 707/10, 101; 715/513, 501.1; 709/203, 206, 219, 217, 218, 245, 229; 717/109

(56) References Cited

U.S. PATENT DOCUMENTS

| | | | |
|---|---|---|---|
| 5,855,015 A | | 12/1998 | Shoham |
| 5,890,172 A | | 3/1999 | Borman et al. |
| 6,031,989 A | * | 2/2000 | Cordell ........................ 717/109 |
| 6,100,890 A | * | 8/2000 | Bates et al. .................. 345/826 |
| 6,189,019 B1 | * | 2/2001 | Blumer et al. .............. 715/513 |
| 6,208,995 B1 | | 3/2001 | Himmel et al. |
| 6,212,522 B1 | | 4/2001 | Himmel et al. |
| 6,223,178 B1 | | 4/2001 | Himmel et al. |
| 6,275,862 B1 | * | 8/2001 | Sharma et al. ............. 709/245 |
| 6,334,145 B1 | * | 12/2001 | Adams et al. .............. 709/219 |
| 6,374,237 B1 | * | 4/2002 | Reese ............................ 707/3 |
| 6,393,462 B1 | * | 5/2002 | Mullen-Schultz ........... 709/206 |
| 6,405,214 B1 | * | 6/2002 | Meade, II .................... 709/203 |
| 6,408,316 B1 | * | 6/2002 | Himmel et al. .......... 715/501.1 |
| 6,427,175 B1 | * | 7/2002 | Khan et al. .................. 709/229 |
| 6,460,038 B1 | * | 10/2002 | Khan et al. .................... 707/10 |
| 6,477,550 B1 | * | 11/2002 | Balasubramaniam et al. ........................... 715/513 |
| 6,493,702 B1 | * | 12/2002 | Adar et al. ..................... 707/3 |

OTHER PUBLICATIONS

"Blink Company", http://www.blink.com/blink/, retrieved Nov. 21, 2000, pp. 1–2.
"Blink Aims to Organize Your Links", http://www.blink.com/blink/html/pressrel/news111299.htm, retrieved Feb. 11, 2000, pp. 1–3.
"A Way to Check E–Mail Without Logging On", http://www.blink.com/blink/html/pressrel/news111199.htm, retrieved Feb. 11, 2000, pp. 1–5.
"Internet Product Watch—blink.com (Blink.com, Inc.)", http://www.blink.com/blink/html/pressrel/pressrel3.html, retrieved Feb. 11, 2000, pp. 1–2.

(List continued on next page.)

Primary Examiner—Patrice Winder
(74) Attorney, Agent, or Firm—Brooks & Kushman P.C.

(57) ABSTRACT

A system and method for providing links to a browser program running on a computer connected to a network include receiving a request from the browser program to transfer a file representing a home page for display in the browser program, and determining a storage location on the computer for links used by the browser program. The system and method may include requesting permission to modify links used by the browser program prior to transferring a list of links to the storage location on the computer for subsequent use by the browser in retrieving information from the network. The list of links may be statically or dynamically generated with one or more links provided by a link server on the network. In one embodiment, accounting information relative to the number and type of links transferred to the user's computer is collected and may be forwarded to an associated billing computer located on the network.

4 Claims, 4 Drawing Sheets

OTHER PUBLICATIONS

"Benefits of a Clickmarks Account", http://www.clickmarks.com/click/benefits.html, retrieved Feb. 11, 2000, pp. 1–2.

"Frequently Asked Questions at Clickmarks", http://www.clickmarks.com/click/FAQ.html, retrieved Feb. 11, 2000, pp. 1–9.

"Clickmarks User Guide: General Questions", http://www.clickmarks.com/click/ug_general.html, retrieved Feb. 11, 2000, pp. 1–3.

"Clickmarks Userguide: Toolbar", http://www.clickmarks.com/click/ug_toolbar.html, retrieved Feb. 11, 2000, pp. 1–2.

"Clickmarks User Guide: Floating Windows", http://www.clickmarks.com/click/ug_float.html, retrieved Feb. 11, 2000, p. 1.

"Clickmarks User Guide: Special Features", http://www.clickmarks.com/click/ug_special.html, retrieved Feb. 11, 2000, pp. 1–3.

"Clickmarks User Guide: Importing/Exporting Your Bookmarks", http://www.clickmarks.com/click/ug_import.html, retrieved Feb. 11, 2000, pp. 1–4.

"Clickmarks User Guide: Managing Your Links", http://www.clickmarks.com/click/ug_manage.html, retrieved Feb. 11, 2000, pp. 1–3.

"Clickmarks User Guide: Managing Your Folders", http://www.clickmarks.com/click/ug_folders.html, retrieved Feb. 11, 2000, pp. 1–4.

"Clickmarks User Guide: Accessing Your Links", http://www.clickmarks.com/click/ug_access.html, retrieved Feb. 11, 2000, pp. 1–2.

"Desktop (CoolSync, Inc.): Get Universal Access to Your Bookmarks—ZDNet Downloads", http://www.zdnet.com/, retrieved Feb. 11, 2000, pp. 1–2.

* cited by examiner

LINK DELIVERY FOR SUBSEQUENT RETRIEVAL OF NETWORKED INFORMATION

TECHNICAL FIELD

The present invention relates to a system and method for delivering multiple structured links to a user to aid in subsequent retrieval of networked information.

BACKGROUND ART

As computers become more powerful and less expensive, the amount and variety of information available to users continues to grow. Increasing computing power has enabled the development of more sophisticated and easier-to-use interfaces that extend the utility of computers beyond researchers and scientists to the average user seeking information. Indeed, the pervasiveness of the Internet is largely attributable to the development of computer software, such as browsers, that made information, available on the Internet for years, finally accessible to the general public without a computer science degree. However, the exponential growth of information available using computer networks, including the Internet, makes it increasingly more difficult for a user to locate a manageable amount of information which is pertinent to a particular request.

To facilitate locating relevant information, various computers include commands or application programs (software) that search for the information and display its location so it can be quickly retrieved by the user. In the case of information or files located on the user's local computer, the operating system often provides a command to locate particular files, documents, or text, such as a "find" command. Likewise, various programs such as "Quick Finder" or "Find Fast" periodically search available information and create an index to facilitate subsequent searches and retrieval by the user. Similarly, the Internet includes a number of computers or sites that search available information resources and create a database or index that can be used for subsequent searches. Relevant information may be located on the user's computer, on a local area network (LAN) or Intranet, or on a computer connected via a wide area network (WAN) such as the Internet.

After identifying the location of information that appears to be pertinent, the user must somehow retrieve the information. Traditionally, this required manually entering the particular path or location of the information using the proper commands and syntax including appropriate colons, slashes, and backslashes. Today, it is more common to associate a pointer or identifier with the path or location so the user only has to select the pointer to access or retrieve the information. For example, shortcuts may be used to associate a particular path or action with a graphical icon that can be selected with a mouse. Likewise, hypertext, hyperlinks, or hotlinks provide a textual or graphical (picture) display to the user which is associated or linked to the desired information resource via a Uniform Resource Identifier (URI) or Uniform Resource Locator (URL). Once located, the user may remember the address or location for subsequent inquiries and retrieval of related information. More often, however, the user will record the location for later use. For example, the user may create a shortcut to the desired location, store the location in a bookmark or favorite places list, or the like. The user can then return to the previously identified electronic information resource (document, file, picture, movie, sound, song, etc.) by simply selecting the corresponding shortcut or bookmark. While this approach provides a more convenient method of remembering and accessing information on a computer or computer network, it is generally used only by intermediate or advanced users who are aware of the availability and how to create and manage shortcuts, bookmarks, and/or favorites. As such, a more "user-friendly" or "one-click" approach, particularly suited to beginning users, is needed.

A number of bookmark or link services have recently emerged to provide users a centralized server accessible via the Internet to store their personalized list of links or bookmarks. These services include various features to help users manage and organize links such as the ability to add, delete, sort, and import or export links to/from the user's computer to the central server. Once resident on the central server, the links may be accessed or updated by the user from any location/computer which has Internet access. However, the export of links to a user's computer simply guides the user through the multiple manual steps which are required to edit and/or store the appropriate file or files on the user's computer system. This approach is similar to the bookmark management tools available to the intermediate or advanced user through the various browser application program, operating system, and special-purpose utilities. A one-step, automatic approach is clearly needed for the average or casual user and would be preferred by beginners as well as advanced users.

Although the Internet emerged as a medium that provided "free" access to all kinds of information, the low cost of entry and sizeable profit-making opportunities of electronic commerce have revolutionized its character. In an effort to strike a balance between "free" access and providing ever-changing content and useful services, many companies and individuals have turned to advertising as a significant source of revenue. Because advertisers often pay for each viewing or "hit" of their advertisement, website developers are encouraged to provide useful content and links to other sites to attract a wide audience and to encourage repeat visitors to a particular site. This suggests that the easier it is for a user to locate a particular site, the more likely the user is to find the site in the first place and to repeatedly return to the site. Thus, in terms of advertising revenue, it is desirable for website developers to provide a quick and convenient method for users to locate relevant information to increase the number of visits or hits for the site. Likewise, for businesses offering goods and services over the Internet, it is desirable to provide user-friendly access to their websites.

DISCLOSURE OF INVENTION

Thus, it is an object of the present invention to provide a system and method for delivery of links to a user.

Another object of the present invention is to provide a system and method for generating revenue based on the delivery of preselected or dynamically generated lists of links.

A further object of the present invention is to provide a system and method for beginning users to quickly and easily record identifying information associated with an information resource for subsequent return to the information resource.

Yet another object of the present invention is to provide a system and method for content providers to automatically deliver links to a user's computer.

Another object of the present invention is to provide a system and method for dynamically generating lists of links based on a particular user's preferences.

A further object of the present invention is to provide a system and method for delivering links to a user based on a predetermined user profile.

A still further object of the present invention is to provide a system and method for modifying a user interface to include selected pointers to information located on a computer and/or a computer network.

Another object of the present invention is to provide a system and method for delivering and integrating a hierarchical list of links into at least one application program menu.

Yet another object of the present invention is to provide a system and method for monitoring the number and types of links delivered to a user.

In carrying out the above objects, and other objects, features, and advantages of the present invention, a method of delivering links for subsequent display by an application program running on a user's computer with each link being associated with a location of information on a computer or a computer network includes assembling a plurality of links for transfer to the user's computer and storing the plurality of links in a location specific to the application program to automatically integrate the plurality of links into at least one menu or toolbar of the application program. In one embodiment, the application program is a browser program and the invention includes a link server which is accessed by a web server to obtain one or more links for storage on the user's computer for subsequent use by the browser. An accounting and/or billing server may also be used to collect information related to the number and/or types of links which have been provided to users. Advertisers and/or web site developers and owners may then be billed for each of their links which have been transferred and stored on a user's computer system.

The present invention provides a number of advantages. For example, the present invention provides a system and method for delivering links to relatively unsophisticated or beginning users which are unaware or unable to manually create shortcuts, bookmarks, or favorites. The present invention may be used to provide links related to a single computer or website, or may provide lists of links grouped by subject matter or category to different sites or computers on a network, such as the Internet. The present invention may be used to provide a table of contents for on-line shopping or magazines and provides a system and method for generating revenue based on the type and number of links which are sent to a user's computer system.

The above advantages and other advantages, objects, and features of the present invention are readily apparent from the following detailed description of the best mode for carrying out the invention when taken in connection with the accompanying drawings.

BEST MODE FOR CARRYING OUT THE INVENTION

Figure 1:
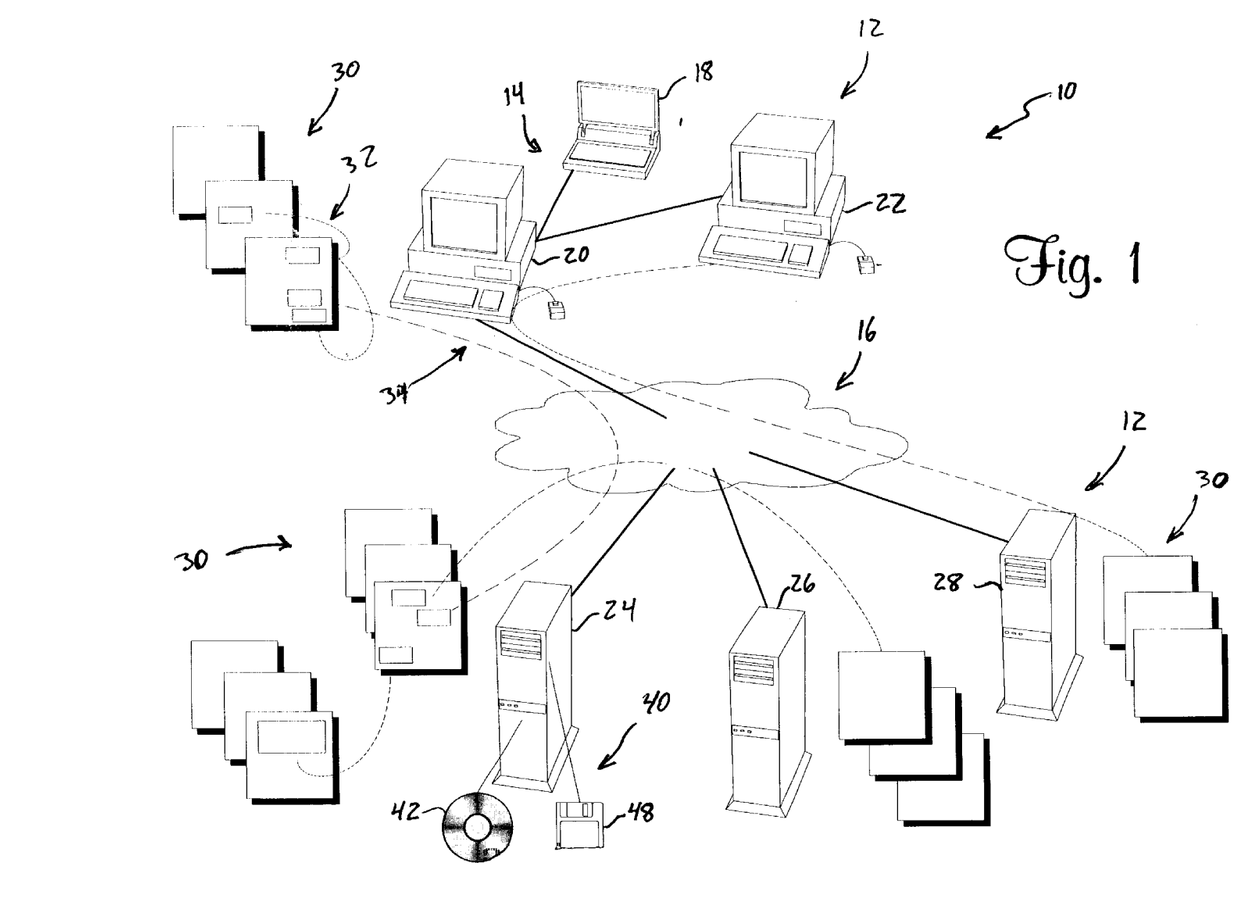
FIG. 1 is a block diagram illustrating an application operating environment for one embodiment of a system or method for link injection according to the present invention.

Referring now to FIG. 1, a block diagram illustrating an application operating environment for one embodiment of a system or method for link injection according to the present invention is shown. The application environment, indicated generally by reference numeral 10, includes a number of computers 12 which may be linked together either directly as represented by numeral 14, or indirectly as represented by numeral 16, via one or more computer networks. In one embodiment, the present invention is used to automatically deliver links over a wide area network such as the Internet. Of course, the present invention may also be used to provide link delivery to computers connected via a local area network, such as network 14.

As represented in FIG. 1, computers 12 may be utilized by different users for a wide variety of computing tasks or functions. For example, computers 12 may include a laptop computer 18 which provides information to a mobile user via a selective or removable connection to a network. Likewise, desktop computers 20 and 22 may be utilized by end users to access various information stored on another computer, such as laptop computer 18. The versatility of local and wide area networks such as the Internet allows computers 18–22 to communicate and exchange information with various other computers which may be located at different sites which perform similar and/or different functions. For example, computers 24, 26, and 28 may be accessed via a wide area network 16 such as the Internet. Computers 24–28 operate as file servers to service requests from various client computers and applications as well known by those of skill in the art.

Computers 12 may be used to provide access to various types of information resources indicated generally by reference numeral 30. Information resources 30 represent a wide variety of types or categories of information and may include a document, file, graphic, image, sound, song, etc. Typically, information resources 30 include one or more links 32 which direct the user to related information resources. A particular information resource 30 may include links to other information or documents on the same computer, such as link 32, or may include links to information stored on other computers accessed over a computer network, such as link 34. Information resources 30 stored on another computer may be accessed via a private, local network which may be physically located in one building, block, or city, or accessed via modem or dedicated lines and located hundreds of kilometers away. As described above, a link, pointer, or identifier provides a textual or graphical display to the user and is associated or linked to the desired information. An application program or software running on a computer can use the link to retrieve the related information. Preferably, the application is a browser which is used to retrieve pages or files encoded in a document language such as HTML. The Worldwide Web is used to refer to computers or servers accessible via the Internet which provide such documents or files.

As an example, with reference to FIG. 1, each of computers 24, 26, and 28 may represent a particular website which is accessible via the Internet. Computer 24 includes information resources 30 for pages which are provided to various computers 18, 20, and 22 at the request of an application program, such as a web browser. Popular web browsers currently available include the Internet Explorer and Netscape Navigator. While particularly suited for these types of application programs, the present invention is not limited to a particular browser or application program.

Typically, each server 24, 26, and 28 includes a particular document or file which is accessed, retrieved, or presented when a user first "arrives" or visits the website. This file is referred to as the home page. The home page is transferred over network 16 to a particular computer 20 and has its content displayed by the browser based on the browser's interpretation of the formatting information which may be specified in HTML, for example. In addition to the basic text, audio, or other multimedia information, each web page will typically include a number of links which may refer to other pages located on the same server, or alternatively to pages located on a different server or website accessible via a computer network. The user can retrieve additional information by clicking or selecting the text or graphic associated with the link. Useful links may be stored on the user's computer in an application-specific location and manner which depends upon the particular application program being utilized. For example, Internet Explorer includes a list of "favorites" which stores shortcuts or links for easy access by the user via a drop-down menu or toolbar button. Similarly, Netscape Navigator includes "bookmarks" to record frequently visited locations or links. Various other application programs and/or operating systems may include similar features for storage of location identifiers, addresses, shortcuts, or the like.

Computers 12 may include various types of computer-readable storage media 40 to store the information resources 30. In addition, computer-readable storage media 40 may be used to store data representing instructions or software which is executed by the computer to perform various functions. Computer-readable storage media 40 may include various types of non-volatile storage such as a CD ROM 42 or floppy disk 48. Likewise, any other type of magnetic, optical, or combination storage media may be used to store the data and instructions used to provide the various functions of the present invention as described in greater detail below.

Figure 2:
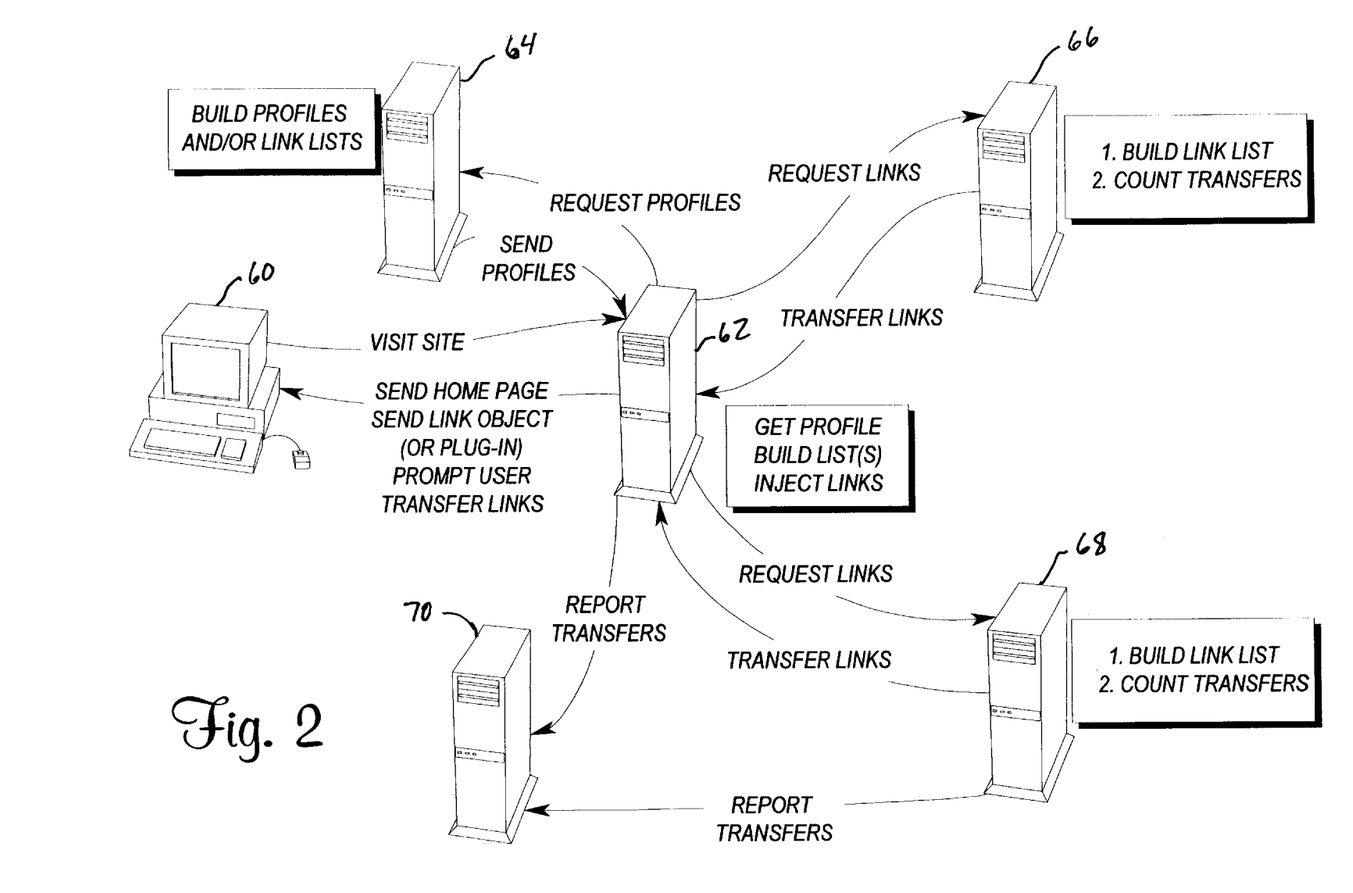
FIG. 2 is a block diagram illustrating operation of an embodiment for delivering a list of links to a user application program according to the present invention.

Referring now to FIG. 2, a block diagram illustrating operation of one embodiment for delivering a list of links to a user application program according to the present invention is shown. In this embodiment, the user's computer system 60 is running a browser program and connected to a network, such as the Internet. When the user enters a particular address of a website or server, such as web server 62, the browser sends a request to the server to transfer information. After receiving the request, web server 62 sends the home page back to computer 60 which is displayed (or played if it includes sounds) by the browser. Depending on the particular format and content of the web page, the browser may require various other helper applications or plug-ins to accurately display the various objects of the page. According to this embodiment of the invention, in addition to other content information, web server 62 sends instructions in the form of an object or plug-in depending upon the particular browser being utilized to computer 60. The object or plug-in works in combination with the browser or other application program to receive subsequent link deliveries or injections from web server 62. The user may optionally be prompted to accept and install the particular object or control, i.e. grant permission, prior to transferring the control to the user's computer system. While illustrated as a single computer, computer system 60 may also represent a local area network as illustrated in FIG. 1.

Web server 62 preferably detects the type of browser or application program used by computer 60 to identify the application-specific storage location where the program keeps links. Those of skill in the art will recognize various other alternatives to identify the type of browser or application program which utilizes links and determine the application-specific storage location. For example, Windows programs often store substantial information relative to user options, program settings, and environment variables in a registry file on the computer's disk. An appropriate registry entry corresponding to the particular browser or application program may then be examined to determine the appropriate location to store links or shortcuts.

Web server 62 may also probe computer 60 to access various other information and develop a user profile for subsequent use in delivering links to computer 60. Alternatively, web server 62 may request profile information from a profile server 64 based on information obtained directly from the user, or indirectly from information stored on computer 60. Profile server 64 may then transfer information to web server 62 to be used in building an appropriate list of links for subsequent transfer to the user's computer system or other application-specific location. Alternatively, server 64 may have predefined or pre-built lists of links for particular subject categories or user interests. Upon identifying an associated interest, server 64 transmits the appropriate lists of links to web server 62. Likewise, web server 62 may use one or more link servers 66 and 68 to provide lists of links. In one embodiment, the application-specific storage location is a shared location either on the user's computer, or on a network accessible server, such as server 68. Web server 62 may use the various links collected from profile server 64 and link servers 66 and 68 in combination with other information stored on web server 62 to dynamically build a complete list of links for transfer to computer 60. Depending upon the particular browser or application program, the list of links may be in the form of a single formatted file, or in the form of a directory structure having multiple directories, subdirectories, and files with each file corresponding to a single link.

With continuing reference to FIG. 2, web server 62 transfers the pre-constructed (or dynamically built) list of links to an appropriate location specified by the user or the application-program preferably such that the links are integrated into at least one menu or toolbar of the application program or browser as explained in greater detail below. Unlike the links provided within the content of a particular web page, such as the web page created in response to a search query on a search engine or the web page created by a bookmark service, the present invention integrates the links into the browser or application program until subsequently modified by the user. Thus, the present invention delivers the links to the application program rather than immediately presenting them to the user along with other information contained within a particular web page. This provides persistent storage of the links for subsequent access to these links or locations even after the application program and/or computer have been closed, shut down, or terminated.

After injecting the list of links into the application program running on computer 60, web server 62 may report the transfer to one or more additional servers, such as an accounting or billing server 70. Preferably, web server 62 records information relative to each injection and immediately or periodically transfers the information to a back-up server for monitoring and an accounting server for billing. The billing or accounting server 70 may be used to track the number and type of links which have been injected into each application program. This information may be used to bill the corresponding website owners/developers or advertisers for providing links to their individual websites.

Figure 3:
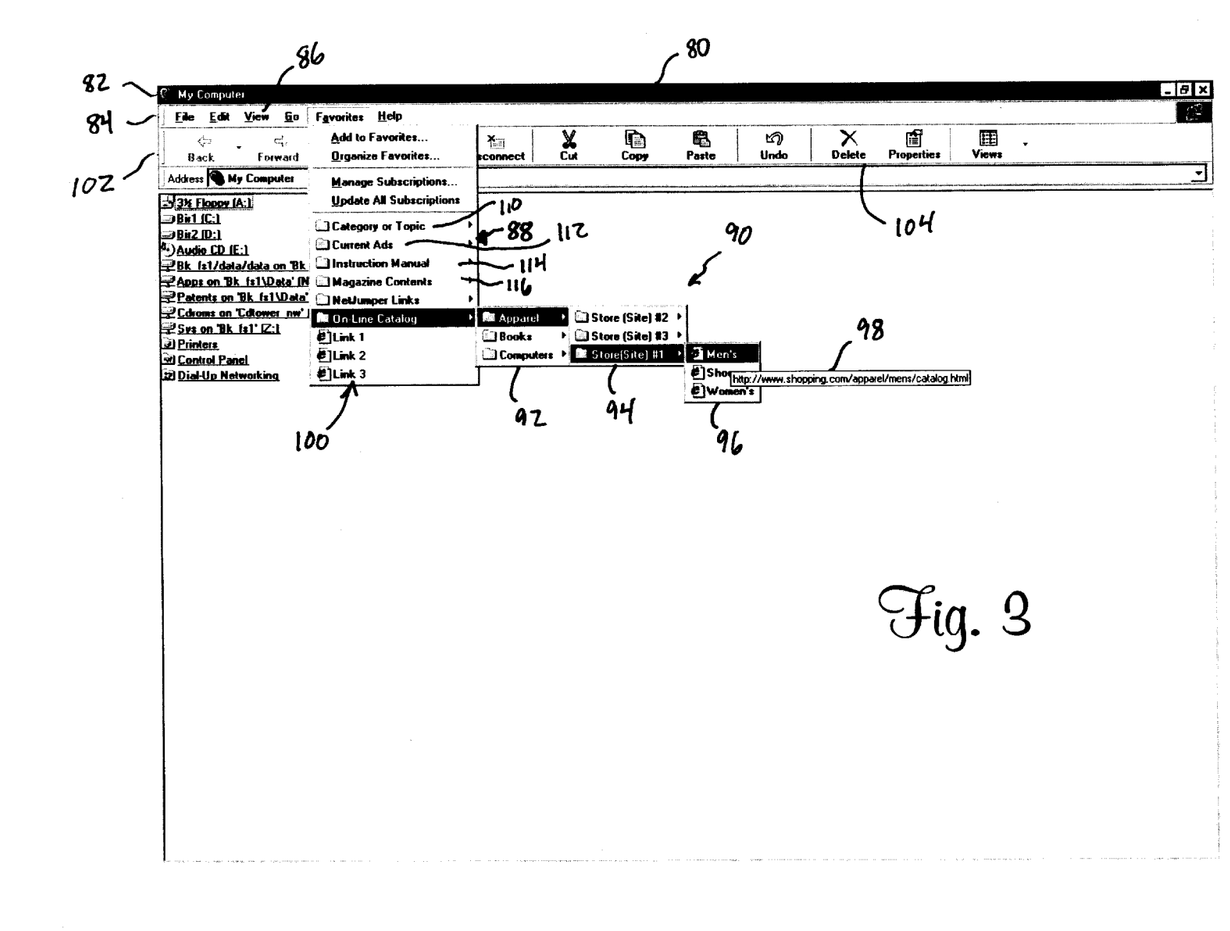
FIG. 3 is a diagram illustrating operation of program menus and/or toolbars having links delivered according to the present invention.

FIG. 3 provides a diagram illustrating operation of program menus and/or toolbars and the links delivered according to one embodiment of the present invention. In this example, the Internet Explorer browser available from Microsoft is illustrated after delivery of a plurality of links according to the present invention. Application window 80 includes a title bar 82 and one or more menus or menu bars 84. Typically, menu bar 84 includes a number of commands 86 which are accessed via drop-down menus 88. The Internet Explorer application program includes a "favorites" feature which is used to store links or shortcuts on the user's computer, where the links and/or shortcuts provide access to information resources located on the user's computer, or accessible via a network such as the Internet. Drop-down menu 88 may also be used to access various cascading sub-menus 90, each of which may include additional sub-menus 92 and 94 and links 96 and 100. When a particular link is selected, the location or address 98 can be seen. Address 98 is used by the browser application program to retrieve the particular information associated with the highlighted text or graphic.

For the example of FIG. 3 using Internet Explorer, links 98 are stored within a hierarchical directory structure in a special system directory or folder. The directory structure is used to provide the cascading menus and links such as menus 88–96. For this application, the present invention constructs a list of links by building an appropriate directory structure in a staging or construction area on the web server which is subsequently transferred to the application-specific location, preferably on the user's computer system, to incorporate the links into the application programs so they are available for future use after quitting the program or restarting the computer, for example. Once the links are delivered according to the present invention, the user may use the menus and/or toolbars to select a particular shortcut or link which has been previously delivered.

Delivery of links may be implemented in a variety of manners without departing from the spirit or scope of the present invention. In one embodiment, the present invention utilizes an Active-X control to provide the link delivery/injection. As known by those of skill in the art, Active-X includes programming instructions which allow the Microsoft Internet Explorer browser to interact with other application programs and the user. An Active-X control may be used to provide functions which are otherwise not commonly available through standard mark-up languages, such as HTML. A variety of programming languages may be used to implement an Active-X control including C++, Visual Basic, or Java, for example, as known by those of skill in the art.

For other application programs, such as the Netscape Navigator browser, the present invention utilizes a helper application or plug-in to perform the link delivery or injection process. Of course, various other methods may be used to accomplish the features and advantages of the present invention. For example, a Java applet may be used to provide the link injection capability according to the present invention. Those of ordinary skill in the art will recognize various other alternative implementations depending upon the particular application programs, operating systems, and environments which are currently available or may become available in the future. For example, the present invention may also be used in environments which utilize "lite" or "thin" client application programs and/or operating systems such as those used in mobile phones, appliances, personal data assistants (PDAs), palm computers, and the like.

Depending upon the particular application program, links may also be accessible via a toolbar 102 which includes various tools or commands 104. For example, in the Netscape Navigator browser, links are accessed via a bookmarks button on the toolbar which provides a similar cascading menu structure such as that illustrated in FIG. 3. However, in applications such as Netscape Navigator, the links are stored within a single HTML file. As such, the present invention injects a plurality of links into the bookmark file by appending a hierarchical structure to the file. Alternatively, the file may be accessed and modified by placing links at various locations within the HTML document. While building an appropriate list of links for injection, the present invention may examine the contents of the previously stored file structure or HTML document to limit the number of links injected. Likewise, the previously stored links may be identified to prevent duplicate links from being added to the directory structure or file.

As illustrated in FIG. 3, the present invention may deliver links associated with a single location or computer. For example, the present invention may deliver links related to a particular topic 110 which includes various websites having information or merchandise relating to that category or topic. Likewise, the present invention may deliver links having current advertisements 112 which are periodically updated either when the user visits a particular website, or via "pushing" the information over the network connection when the user is connected. The latter technology is typically most effective for users which have a permanent or persistent connection to the network as opposed to those which use a modem to provide dial-up access. The present invention may also be used to access information on the local computer such as an instruction manual 114. In this type of application, the present invention acts as a table of contents or index by providing the path or location of the particular chapters or topics. Similarly, the present invention may be utilized to deliver links corresponding to the contents of an on-line magazine as represented by reference numeral 116. Those of ordinary skill in the art will recognize various other applications for link delivery according to the present invention.

Figure 4:
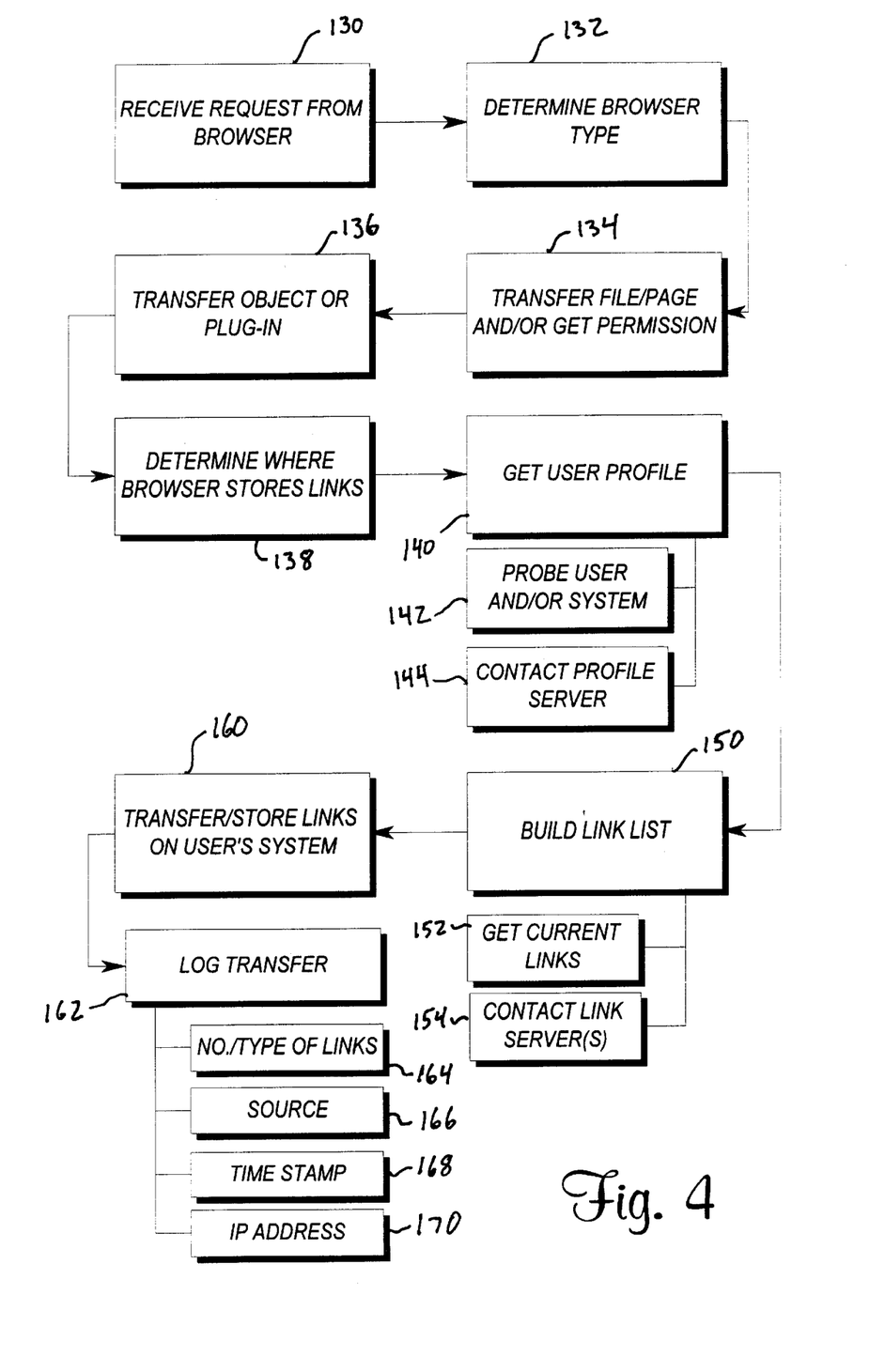
FIG. 4 is a flow chart illustrating operation of a system or method for delivering links according to the present invention.

Referring now to FIG. 4, a flowchart illustrating operation of a system or method for delivering links according to the present invention is shown. As will be appreciated by one of ordinary skill in the art, the block diagram of FIG. 4 represents control logic which may be implemented or effected in hardware, software, or a combination of hardware and software. The various functions are preferably implemented in software and executed by a computer. As will also be appreciated by those of skill in the art, the control logic illustrated may be implemented using any of a number of known programming and processing techniques or strategies and is not limited to the order or sequence illustrated in FIG. 4. For example, interrupt or event-driven processing may be used. Likewise, parallel processing, multi-tasking, or multi-threading systems and methods may be used to accomplish the objectives, features, and advantages of the present invention. The invention is independent of a particular programming language, operating system, processor, or other software/hardware used to develop and/or implement the control logic illustrated. Depending upon the particular programming language and processing strategy utilized to implement the present invention, various functions may be performed in the sequence illustrated, at substantially the same time, or in a different sequence while accomplishing the features and advantages of the present invention. The illustrated functions may be modified, or in some cases omitted entirely, without departing from the spirit or scope of the present invention. Those of skill in the art will recognize various functions which may be performed by a single computer/processor or may be distributed among several processors connected via a network.

Block 130 of FIG. 4 represents receiving a request from an application program such as a browser. A particular application or browser type may then be determined as represented by block 132. In addition to the application program information, this step may include obtaining various other system information such as the processor family, operating system and version, CPU speed, available memory, etc. This information may then be used to transfer an appropriate file or page, such as a home page as represented by block 134. Likewise, a user prompt or window may be transmitted to get permission from the user to install the appropriate link injection control if desired. In addition to alerting the user to the control program installation, permission may be requested before injecting each link or list of links. Of course, it is not required that the present invention obtain permission prior to transferring links to the user's computer system. In many applications, permission is implied based on the security settings or controls selected in the user's application program, by a network administrator, or the like. Depending upon the particular system information which preferably includes the browser or application program type and the operating system version, the appropriate link delivery control is transferred as represented by block 136. The control may be in the form of a Java applet, an Active-X control, or a plug-in, for example. Once the control has been transferred to the user's computer system, the link delivery control may be used by any website which includes the link serving software either transparently, or with the user's knowledge and/or permission.

Block 138 of FIG. 4 represents determining where the application program stores links. This may be determined by the type of application program, by the operating system, by the particular settings associated with the application program or browser, or based on other information stored on or in the user's computer. Such information may include entries stored in environment variables or parameters in memory, in BIOS, or on the disk, such as registry entries and the like. In addition, block 138 may represent determination of whether the application program stores links in the form of a directory structure or in a single file.

In one embodiment of the present invention, a user profile may be obtained as represented by block 140. In this embodiment, the user profile may be obtained by probing the user and/or the user's computer system as represented by block 142. Alternatively, a separate service or profile server may be contacted to obtain relevant information as represented by block 144. For example, block 142 may represent asking the user to select a particular category of links or individual links which the user would like to receive. Alternatively, the present invention may ask the user to complete a survey to determine the types of links desired and automatically select the links based on paid subscribers wishing to target a particular audience with similar interests. In another embodiment, the present invention may utilize information stored on the user's system to develop a customer user profile. For example, the present invention may use one or more "cookies" to develop and store a user profile for subsequent use in selecting appropriate links for delivery. As known by those of skill in the art, a "cookie" allows website developers to store particular information on the user's computer which can be retrieved during a subsequent visit. A cookie allows the web server to automatically identify the particular user based on the previously stored information. Similarly, various other information stored on the user's computer system may be used to develop a user profile to determine the categories and types of links the user may want to receive.

Block 150 represents selecting or building a list of links for delivery to the user. Selection of an appropriate link list may be performed by simply selecting a default list for delivery to the user. The default list would be pre constructed or predetermined prior to the user arriving at the website. Alternatively, the present invention may dynamically generate a link list to provide the most current information to the user. The link list may be built by combining links and previously generated lists of links into a master list for delivery. Links may be obtained from various other servers as represented by block 154. In addition, the current list of links on the user's computer system may be obtained and used in building the link list as represented by block 152. For example, if the user is running the Netscape Navigator browser, the present invention may examine the bookmarks file prior to modifying the file to eliminate any duplicate entries. Alternatively, the present invention may simply append a list of links to the end of the existing file. This alternative provides a simpler implementation because it is not necessary to parse and analyze the current bookmark file to identify and eliminate duplicate links.

With continuing reference to FIG. 4, block 160 represents transferring and storing the list of links on the user's computer system. Preferably, the list of links is transferred to an application-specific location such that the list of links is automatically integrated into the menu or toolbar of the application program. Of course, the application-specific location may be a shared location to make the links available to more than one application on the user's computer or on a network server. The user may also be prompted to specify the location and/or name(s) to store the list of links either for convenience and organization purposes, or to obscure the actual identity or location of the links. When the user is prompted to determine a location for storage of the links, the user-specified location is preferably within the application-specific directory structure or file so the links will be integrated into the application program or computer system.

The delivery of links may be logged as represented by block 162. This function may be performed by the web server with information periodically transferred to an accounting or billing server. The collected information may include the number and type of links which were delivered as represented by block 164. Likewise, the information may include the source of the links 166 used to generate the list of links at block 150. Other information may include the current date and time 168 in addition to various other identification information such as the IP address 170 of the user's computer.

Because the link injection process provided by the present invention can be made transparent to the user, the present invention provides a method for delivering links to relatively unsophisticated users which may be unaware or unable to manually create shortcuts, bookmarks, or favorites. In addition, the present invention provides a revenue source for website developers similar to the current revenue stream produced by banner advertisements. While the present invention is particularly suited for use over the Internet, it also provides a method for corporate users to automatically update bookmarks or favorites for all users on a corporate Internet or local area network. The bookmarks and favorites may include links to internal document servers in addition to external resources available via the Internet.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for delivering links from a web server to a browser running on a user's computer system, the method comprising:

receiving a request from the browser to transfer a file representing a page for display in the browser;

automatically transferring a plurality of objects contained within the page to the browser in response to the request, wherein at least one object includes instructions for transferring a hierarchical directory structure of files and directories to the user's computer system;

generating a list of links to be transferred to the user's computer system by assembling a plurality of links into a hierarchical directory structure of files and directories wherein each file corresponds to a single link;

transferring the hierarchical directory structure of files and directories to the user's computer system;

storing the hierarchical directory structure of files and directories in a browser-specific location using the previously transferred instructions contained within the object such that the hierarchical directory structure integrates the plurality of links into at least the browser.

2. The method of claim 1 further comprising:

prompting the user to enter at least one name corresponding to at least one directory of the hierarchical directory structure.

3. The method of claim 1 further comprising:

recording accounting information relative to number and type of links transferred and stored on the user's computer system; and transferring the accounting information to an accounting server.

4. The method of claim 1 further comprising:

prompting the user to determine a location for storage of the hierarchical directory structure within a directory located in the browser-specific location of the user's computer system.

* * * * *